(No Model.)

R. D. MAYO.
COMB CLEANER.

No. 577,052. Patented Feb. 16, 1897.

WITNESSES
Jos Gregory
H. H. Byrne

INVENTOR
Robert D. Mayo.
by John Wedderburn
Attorney

UNITED STATES PATENT OFFICE.

ROBERT D. MAYO, OF FRANKFORT, MICHIGAN.

COMB-CLEANER.

SPECIFICATION forming part of Letters Patent No. 577,052, dated February 16, 1897.

Application filed November 25, 1896. Serial No. 613,393. (No model.)

*To all whom it may concern:*

Be it known that I, ROBERT D. MAYO, a citizen of the United States, residing at Frankfort, in the county of Benzie and State of Michigan, have invented certain new and useful Improvements in Comb-Cleaners; and I do hereby declare the following to be a full, clear, and exact description of the invention, such as will enable others skilled in the art to which it appertains to make and use the same.

My invention relates to comb-cleaners.

Prior to my invention comb-cleaners of more or less efficiency have been produced, but because no provision has been made whereby contact is maintained between the cleaner and the tapering tooth throughout its length they have generally proven unsatisfactory.

My object is to provide a simple and cheap comb-cleaner which will remain attached to the comb at all times and be adapted for manipulation to satisfactorily clean the teeth throughout their whole length.

The invention consists in certain novel features of construction hereinafter fully described and claimed.

Figure 1:
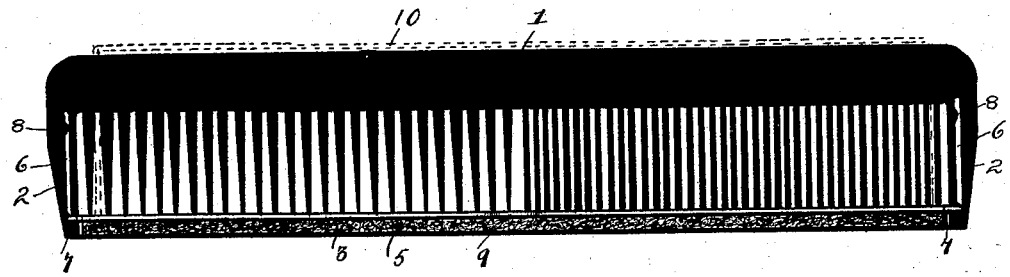
Figure 2:
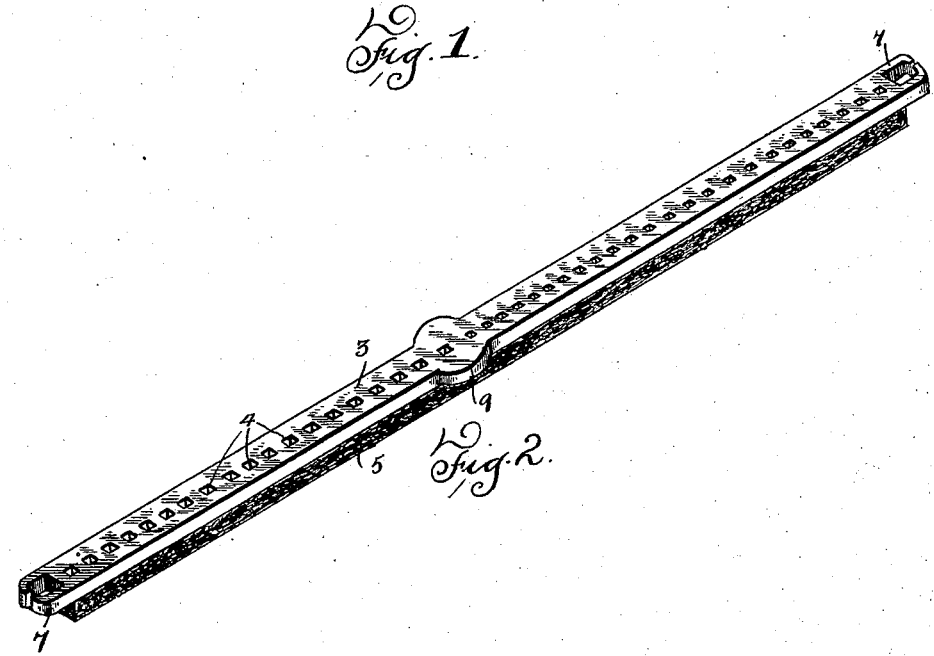
Figure 3:
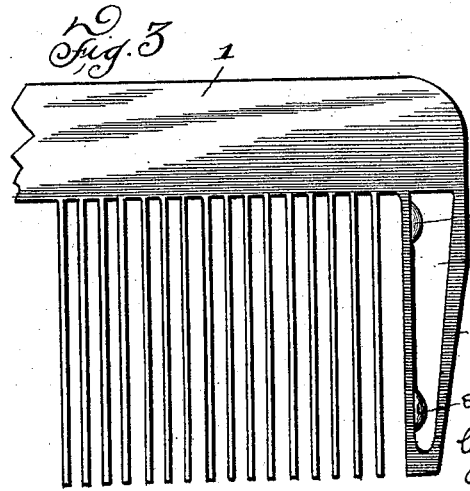

In the accompanying drawings, Figure 1 is a side elevation of a comb provided with my device and showing a modification thereof in dotted lines; Fig. 2, a perspective view of the cleaning-bar, and Fig. 3 an enlarged side elevation of one end of Fig. 1.

The comb 1 is of the usual shape, being provided with enlarged end teeth 2.

My cleaner consists of a bar 3, having slots 4, adapted to fit over and rub against the teeth of the comb. A strip of rubbing material 5, provided with similar slots to those in the bar 3, also fits over the teeth and is attached to said bar. This strip is preferably made of elastic material, and the slots therein are made smaller than the slots in the bar to enable this rubbing-strip to engage the teeth closely at any position thereon in which the bar may be. Slots 6 are cut in the end teeth 2. Extensions 7 on the bar are bent into these slots and secure said bar to the comb. Lateral protuberances 8 extend from the side of the slot into the same and hold the bar in either its upper or lower position. In this form of my device I provide projections 9 on the sides of the bar to enable it to be grasped more firmly when in use. In my modified form I provide a handle 10 for this purpose.

Having thus described my invention, what I claim as new, and desire to secure by Letters Patent, is—

1. The combination with a comb, having slots in the end teeth thereof, of a comb-cleaner having a bar provided with slots, each receiving one of the teeth of the comb, and projections on said bar moving within the slots on the end teeth of the comb and adapted to secure said cleaner to said comb.

2. The combination with a comb having slots in the end teeth thereof, of a comb-cleaner having a bar provided with slots, each receiving one of the teeth of the comb, an elastic strip, having slots therein registering with the slots in the bar, fastened to said bar, and projections on said bar moving within the slots in the end teeth of the comb adapted to secure said cleaner to said comb.

3. The combination with a comb having slots in the end teeth thereof and lateral lugs projecting within said slots, of a comb-cleaner having a bar provided with slots, each receiving one of the teeth of the comb, an elastic strip fastened to the bar and having slots therein, registering with the slots in the bar, said strip being adapted to closely embrace the sides of the teeth, and projections on said bar moving within the slots in the end teeth of the comb adapted to pass behind and be held by the aforesaid lugs.

4. The combination with a comb having slots in the end teeth thereof, of a comb-cleaner having a bar provided with slots, each receiving one of the teeth of the comb, an elastic strip, having slots therein registering with the slots in the bar, fastened to said bar, projections on said bar moving within the slots in the end teeth of the comb adapted to secure said cleaner to said comb, and gripping-pieces attached to said bar to reciprocate it upon said teeth.

In testimony whereof I have signed this specification in the presence of two subscribing witnesses.

ROBERT D. MAYO.

Witnesses:
 JESSE HARRIS,
 AUSBURN WAKEFIELD.